(12) United States Patent
Dahle et al.

(10) Patent No.: US 10,413,123 B2
(45) Date of Patent: *Sep. 17, 2019

(54) SYSTEM, DEVICE, AND METHOD FOR BAKING A FOOD PRODUCT

(71) Applicants: GRI Capital, LLC, North Logan, UT (US); Pizza Chef Grill, Inc., Wellsville, UT (US)

(72) Inventors: Roger Dahle, Providence, UT (US); Derrick Longson, Wellsville, UT (US); Wayne B. Hardy, Millville, UT (US); Deno R. Blau, Providence, UT (US)

(73) Assignees: GRI Capital, LLC, North Logan, UT (US); Pizza Chef Grill, Inc., Wellsville, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,776

(22) Filed: Dec. 23, 2017

(65) Prior Publication Data

US 2018/0199758 A1 Jul. 19, 2018

Related U.S. Application Data

(63) Continuation of application No. 14/877,899, filed on Oct. 7, 2015, now Pat. No. 9,848,731, which is a continuation of application No. 14/184,716, filed on Feb. 20, 2014, now Pat. No. 9,182,129.

(60) Provisional application No. 61/767,249, filed on Feb. 20, 2013.

(51) Int. Cl.
*F24C 15/16* (2006.01)
*A47J 37/07* (2006.01)
*A21D 8/06* (2006.01)
*A21B 1/44* (2006.01)
*F24C 3/02* (2006.01)

(52) U.S. Cl.
CPC ............. *A47J 37/0727* (2013.01); *A21B 1/44* (2013.01); *A21D 8/06* (2013.01); *F24C 3/027* (2013.01); *F24C 15/16* (2013.01)

(58) Field of Classification Search
CPC .......... A47J 37/0727; A21B 1/44; A21D 8/06; F24C 3/027; F24C 15/16
See application file for complete search history.

(56) References Cited

U.S. PATENT DOCUMENTS

| | | | |
|---|---|---|---|
| 3,033,189 A | 5/1962 | Clark |
| 3,033,190 A | 5/1962 | Atkinson |
| 3,085,497 A | 4/1963 | Statia, Sr. |
| 3,131,685 A | 5/1964 | Bergfield |

(Continued)

*Primary Examiner* — Steven N Leff
(74) *Attorney, Agent, or Firm* — David L. Stott

(57) ABSTRACT

Devices, systems, and methods are provided for baking a food product in a portable baking oven. The baking oven includes a main body, lower and upper stones, a heat shield suspending the upper stone above the lower stone, and a heat element emanating heat upward to a rotating flat panel having the lower stone thereon. Convection heat from the heat element moves upward from below the rotating flat panel and past a periphery of the flat panel, channeled by the heat shield to the upper stone, to move along the upper stone, and then down along the heat shield, on the opposite side. With this arrangement, the heat element heats the upper and lower stones with convection heat moving between the lower and upper stones in a side-to-side manner.

20 Claims, 4 Drawing Sheets

(56) References Cited

U.S. PATENT DOCUMENTS

| | | | |
|---|---|---|---|
| 3,134,320 A | 5/1964 | Meyer | |
| 3,298,301 A | 1/1967 | Lowndes | |
| 3,448,679 A | 6/1969 | Holka et al. | |
| 3,511,167 A | 5/1970 | Holtkamp | |
| 3,552,299 A | 1/1971 | Patoka | |
| 3,657,996 A | 4/1972 | Thompson | |
| 3,848,523 A | 11/1974 | Galisz | |
| 4,305,329 A | 12/1981 | Fenoglio | |
| 4,384,513 A | 5/1983 | Pierick | |
| 4,506,652 A | 3/1985 | Baker et al. | |
| 4,805,587 A | 2/1989 | Schweitzer | |
| 4,938,687 A | 7/1990 | Monteil | |
| 5,378,872 A | 1/1995 | Javanovic | |
| 5,398,666 A | 3/1995 | Smith et al. | |
| 5,492,055 A | 2/1996 | Nevin et al. | |
| 5,523,104 A | 6/1996 | Kirk | |
| 5,682,873 A | 11/1997 | Chambers | |
| 5,873,300 A | 2/1999 | Kuhlman | |
| 6,125,740 A | 10/2000 | Hedrington et al. | |
| 6,146,677 A | 11/2000 | Moreth | |
| 6,187,359 B1 | 2/2001 | Zuccarini | |
| 6,250,210 B1 | 6/2001 | Moreth | |
| 6,354,194 B1 | 3/2002 | Hedrington et al. | |
| 6,967,036 B1 | 11/2005 | Hedrington et al. | |
| 7,219,663 B2 | 5/2007 | Cuomo | |
| 7,686,010 B2 | 3/2010 | Gustavsen | |
| 8,181,640 B2 | 5/2012 | Park | |
| 8,291,896 B1 * | 10/2012 | Gonnella | F24C 3/14 |
| | | | 126/19 R |
| 8,578,927 B2 | 11/2013 | Gustavsen | |
| 2010/0147281 A1 | 6/2010 | Gustavsen | |

* cited by examiner

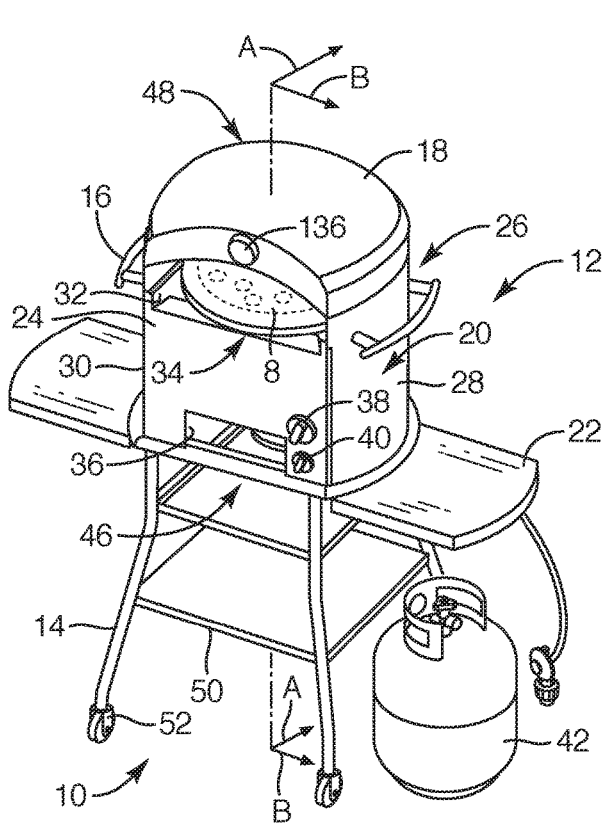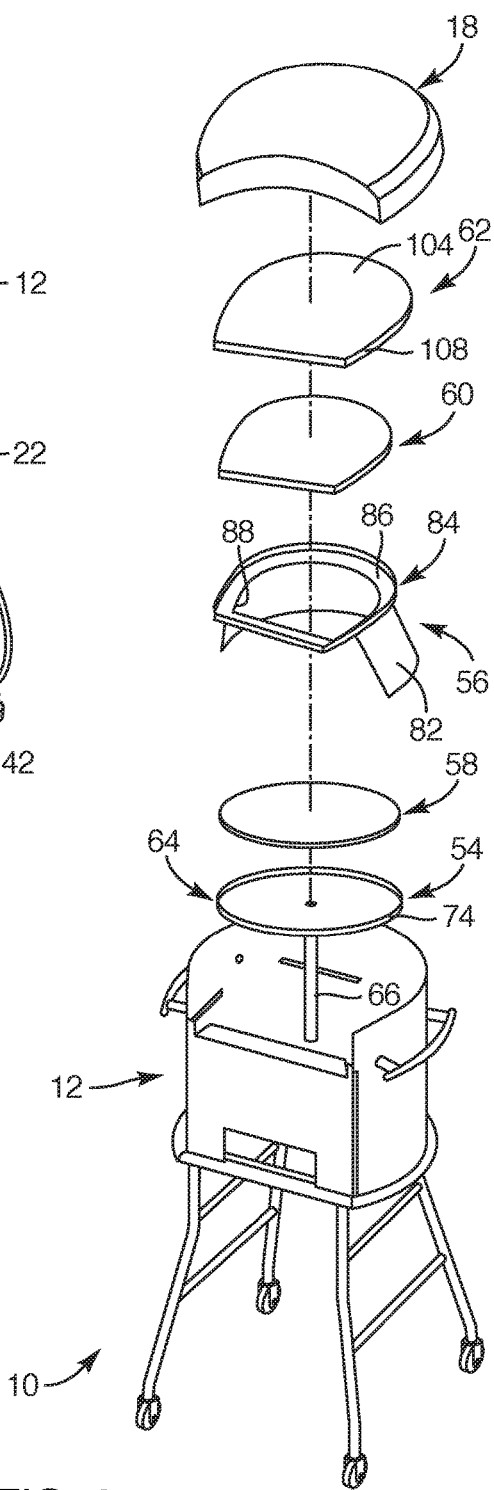
FIG. 1
FIG. 2

SYSTEM, DEVICE, AND METHOD FOR BAKING A FOOD PRODUCT

CROSS-REFERENCE TO RELATED APPLICATIONS

The present application is a continuation of U.S. application Ser. No. 14/877,899, filed Oct. 7, 2015, which is a continuation of U.S. application Ser. No. 14/184,716, filed Feb. 20, 2014, now U.S. Pat. No. 9,182,129, which claims the benefit of U.S. Provisional Application No. 61/767,249, filed Feb. 20, 2013, the contents of each of which are incorporated by reference herein in their entireties.

TECHNICAL FIELD

The present invention relates generally to ovens and, more specifically, the present invention relates to devices, systems, and methods for baking a food product, such as pizza, in an oven.

BACKGROUND

Commercial brick ovens designed for baking pizza are generally very large, stationary and require preheating for long periods due to the high temperatures needed for such brick ovens, typically between 600 to 1000 degrees Fahrenheit. These brick ovens are typically only found in specialty restaurants since the cost for such brick ovens can run tens of thousands of dollars. Attempts have repeatedly been made to provide specialty pizza ovens for household use that mimic the taste of a brick oven baked pizza. However, the specialty pizza ovens for household use are still very large and heavy and, as such, generally remain in one location at the household. Further, due to the high temperatures needed, these specialty pizza ovens for household use typically require constant attention due to hot spots in the oven or inconsistent temperatures from above and below the pizza, causing either the top or bottom of the pizza to burn before other portions are fully baked. Also, the household pizza ovens are still relatively expensive for most to afford, i.e., several thousands of dollars.

Based on the foregoing, it would be advantageous to provide an oven for baking pizza that is relatively light and readily moveable from one location to another, quickly obtains and maintains the high temperatures that are desirable for baking pizza, and provides the structural characteristics that facilitate baking pizza at high temperatures without burning portions before the pizza is fully baked. It would also be advantageous to provide a pizza oven that is affordable for most households.

BRIEF SUMMARY OF THE INVENTION

The present invention is directed to devices, systems, and methods for baking a food product. For example, in one embodiment, a baking oven for baking a food product is provided. The baking oven includes a main body, a heat shield, a rotating member, a motor, first and second stones, and a heat element. The main body includes an upstanding wall extending along a front side, a rear side, a first side, and a second side of the main body such that the main body includes an opening defined in the front side of the main body. The heat shield includes a side wall extending inward from a lower end to an upper end. The lower end extends from at least the first side and the second side of the main body and the upper end extends to define a ledge. The rotating member includes a flat panel and a shaft. The shaft extends from an underside surface of the flat panel and defines an axis along a longitudinal length thereof. The motor includes a drive shaft and the motor is coupled to the main body. The drive shaft is coupled to the shaft to rotate the rotating member about the axis. The first stone is configured to be positioned on the flat panel and configured to rotate with the flat panel. The second stone is configured to be positioned over the ledge of the heat shield above the first stone. The heat element is coupled to the main body such that the heat element is positioned to emanate heat adjacent the first side of the main body and below the flat panel. The heat element provides convection heat to move upward from the heat element adjacent the first side and along the heat shield to the second stone, and moves along the second stone and then down the heat shield toward the second side of the main body and down below the flat panel and the first stone.

In one embodiment, the ledge of the heat shield extends about a periphery of the upper end of the heat shield and defines an opening to expose the second stone to the convection heat. In another embodiment, the heat element emanates heat to the underside surface of the flat panel adjacent the first side to conduct heat directly from the flat panel to the first stone as the flat panel rotates. In another embodiment, the flat panel includes an upper side surface configured to correspond substantially with an entire underside surface of the first stone so that the upper side surface of the flat panel directly contacts substantially the entire underside surface of the first stone. In another embodiment, the second stone is configured to radiate heat downward toward the first stone upon convection heat contacting the second stone.

In another embodiment, the heat element is coupled to a heat source, the heat source including at least one of propane gas and natural gas. In another embodiment, the shaft of the rotating member includes a notch at a lower end thereof sized and configured to receive the drive shaft of the motor. In yet another embodiment, the baking oven further includes a heat cover sized and configured to overlay an upper surface of the second stone. In still another embodiment, the baking oven further includes a main cover sized and configured to cover a top side of the main body.

In another embodiment, the baking oven includes a main cover defining a top opening. In another embodiment, the baking oven includes a duct structure defining the top opening. The duct structure may be sized and configured to draw heat from the baking chamber and through the duct structure. The convection heat may heat the baking chamber side-to-side therein and then be channeled around a front periphery of the heat shield and upward toward and through the duct structure.

In another embodiment, the baking oven includes a second heat shield sized and configured to minimize heat conduction to exposed portions of the baking oven. The second heat shield may be positioned between the heat element and the main body of the baking chamber. The second heat shield may include a gap between the second heat shield and the main body of the baking oven.

In accordance with another embodiment of the present invention, a portable baking oven for baking a food product is provided. The portable baking oven includes a main body having a baking chamber therein. The main body includes a front side, a rear side, a first side and a second side. The first side and the second side each extend between the front side and the rear sides. The front side defines an opening to expose the baking chamber. The baking chamber includes a flat panel configured to rotate, a lower stone supported by the flat panel and configured to rotate with the flat panel, an upper stone suspended above the lower stone, and a heat shield. The heat shield includes a wall extending inward and upward from at least the first side and the second side of the main body to a stone support portion such that the stone support portion is configured to support the upper stone thereon. The portable baking oven also includes a heat element. The heat element is coupled to the main body such that the heat element is positioned to emanate heat adjacent the first side of the main body and below the flat panel. The heat element provides convection heat to move upward from the heat element adjacent the first side and along the heat shield to the upper stone, and moves along the upper stone and then down the heat shield toward the second side of the main body and down below the flat panel and the lower stone.

In another embodiment, the heat element emanates heat to an underside surface of the flat panel adjacent the first side to conduct heat directly from the flat panel to the lower stone as the flat panel rotates such that the lower stone includes an underside surface substantially entirely in contact with an upper side surface of the flat panel.

In accordance with another embodiment of the present invention, a method of cooking a food product in a portable baking oven is provided. The method includes the steps of providing a first stone positioned on a circular flat panel defining a radius with a second stone suspended on a heat shield above the first stone such that the heat shield extends radially inward and upward from an inner surface of an upstanding wall of a main body adjacent the first stone to a ledge suspending the second stone and such that an air-flow gap is defined between the heat shield and a periphery of the flat panel; rotating the flat panel and the first stone positioned on the flat panel with a motor coupled to a shaft extending from a bottom of the flat panel such that the flat panel rotates about an axis defined by the shaft; heating the first stone and the second stone from a heat element coupled to the main body by emanating heat from one side portion of the main body, a portion of the heat element positioned a distance from the axis of the shaft corresponding to about the radius of the flat panel such that convection heat moves upward below the flat panel and around the periphery of the flat panel adjacent the one side portion of the main body and through the air-flow gap along the one side portion of the main body so that convection heat moves within the main body toward an opposite side portion within the main body in a side-to-side manner; and placing the food product on an upper surface of the first stone.

In one embodiment, the method step of heating includes flowing convection heat through the air-flow gap and upward along the heat shield to the second stone and between the first and second stone, and continues flowing convection heat to move to the opposite side portion of the main body and along the heat shield and downward through the air-flow gap to below the flat panel and the first stone. In another embodiment, the method step of heating includes heating an underside surface of the flat panel for conducting heat directly from the flat panel to the lower stone as the flat panel rotates. Further, in still another embodiment, the method step of heating includes heating an underside surface of the flat panel such that the flat panel includes an upper side surface that corresponds with and directly contacts substantially an entire underside surface of the lower stone such that the heating comprises conducting heat directly from the flat panel to the lower stone as the flat panel rotates. In yet another embodiment, the method step of heating includes radiating heat downward from the upper stone upon the upper stone being heated by convection heat.

In another embodiment, the method step of rotating includes rotating the shaft with a drive shaft vertically extending from the motor and coupled to an end of the shaft. In another embodiment, the method step of heating includes heating with a heat source including at least one of propane gas and natural gas. In another embodiment, the method step of heating includes rotating air from side-to-side within the main body, not from rear-to-front of the main body, to limit air-flow from exiting an opening defined in a front side of the main body. Further, in another embodiment, the method step of rotating includes limiting continual direct heat emanating from the heat source to a single location at an underside of the flat panel.

In accordance with another embodiment of the present invention, a baking oven for baking a food product is provided. The baking oven includes a main body, a baking chamber, a motor, and a heat source. The main body includes an upstanding wall extending to a front side portion, a rear side portion, a first side portion, and a second side portion, the first side portion and the second side portion extending between the front side portion and the rear side portion, the front side portion defining an opening to insert and access the food product. The baking chamber is within the main body and viewable from the opening defined in the main body. The baking chamber includes a lower stone, an upper stone, and a heat shield. The lower stone is positioned on a flat panel that defines a periphery and the lower stone includes an upper surface configured to receive and bake the food product. The flat panel includes a shaft that defines a longitudinal axis, the shaft being coupled to an underside surface of the flat panel. The upper stone is suspended above the lower stone. The heat shield extends inward and upward from an inner surface of the upstanding wall of at least the first side portion and the second side portion of the main body. The heat shield includes the upper stone positioned and suspended on the heat shield and above the lower stone. The heat shield and the periphery of the flat panel define an air flow gap therebetween and adjacent to the first side portion and the second side portion of the main body. The motor includes a drive shaft, the motor being coupled to the main body and the drive shaft being coupled to the shaft extending from the flat panel. The motor is configured to rotate the flat panel and the lower stone about the longitudinal axis of the shaft. The heat source is coupled to the main body and is configured to emanate heat from a location adjacent the first side portion and below the flat panel. Further, the heat source provides convection heat that extends below the flat panel and around the periphery of the flat panel through the air-flow gap so that convection heat moves upward adjacent the first side portion and along the heat shield to the upper stone and along a length of the upper stone, and then down an opposite side adjacent the second side portion and along the heat shield and through the air-flow gap of the opposite side to below the flat panel and the lower stone.

In another embodiment, the heat source emanates heat to the underside surface of the flat panel adjacent the first side portion to conduct heat directly from the flat panel to the lower stone as the flat panel rotates. The lower stone includes an underside surface that is substantially entirely in contact with an upper side surface of the flat panel.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 1 is a perspective view of a baking oven, according to an embodiment of the present invention;

FIG. 2 is a partially exploded view of the baking oven, according to another embodiment of the present invention;

DETAILED DESCRIPTION OF THE INVENTION

Figure 6:
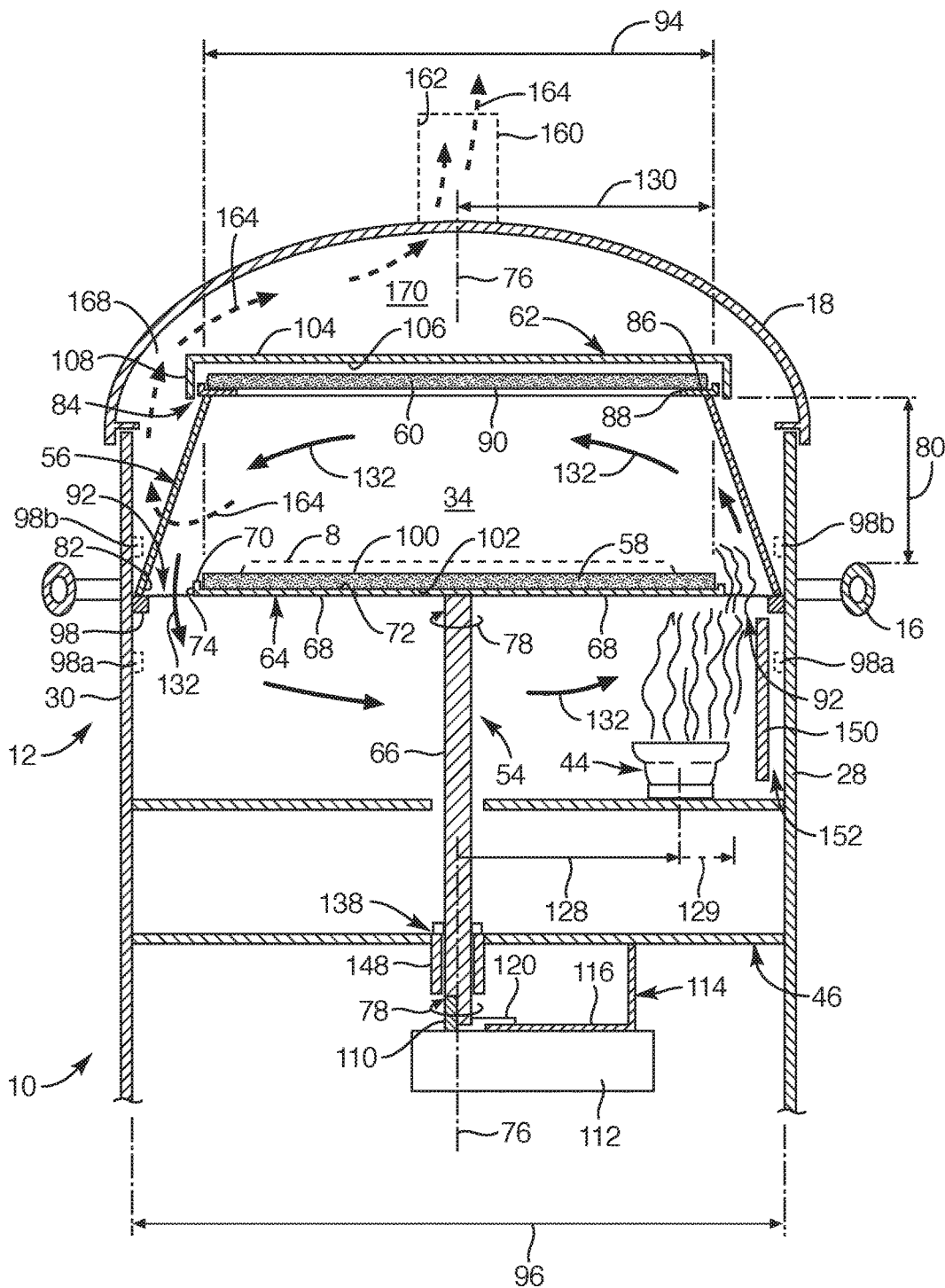
FIG. 6 is a partial cross-sectional side view of the baking oven, taken along section line A of FIG. 1, according to another embodiment of the present invention.

Referring to FIGS. 1 and 6, a baking oven 10 sized and configured to bake a food product 8, such as pizza, or the like, is provided. Such a baking oven 10 includes a main body 12, a lower stone 58 that rotates, an upper stone 60 suspended above the lower stone 58 via a heat shield 56, and a heat element 44 positioned below and to one side of the rotating lower stone 58. As the heat element 44 emanates heat upward, the rotating lower stone 58 is heated while convection heat moves along the heat shield 56 and along a length of the upper stone 60, moving through a baking chamber 34 in a side-to-side manner. The convection heat may then be drawn to move down an opposite side of the heat shield 56 to below the lower stone 58 such that the convection heat may then be drawn to the upward emanating heat provided by the heat element 44 to recirculate the convection heat through the baking oven 10. With this arrangement, the location of the heat element 44 below the lower stone 58 moves convection heat through the baking chamber 34 in a side-to-side manner and, further, recirculates the heat through the baking oven 10. In this manner, the baking oven 10 of the present invention may quickly achieve and maintain the desired temperatures for baking the food product.

The baking oven 10 may be sized and configured to be portable, meaning that the baking oven 10 may be relatively light-weight, compared to typical ovens, and/or may be readily moveable from one location to another. Further, the baking oven 10 may be sized and configured to be employed similar to a backyard type barbeque grill such that the baking oven 10 may be connected to a typical propane fuel tank or the like and may include a wheel type base. Such structural characteristics enable the baking oven in its portability.

With reference to FIG. 1, the baking oven 10 may include the main body 12, legs 14, handles 16, a main cover 18, and side shelves 22 or the like. The main body 12 may include an upstanding side wall 20 to at least partially define the main body 12. Such upstanding side wall 20 may extend over a front side 24, a rear side 26, a first side 28, and a second side 30 of the main body 12. The first side 28 and the second side 30 being opposite each other and each extending between the rear side 26 and the front side 24. The first side 28 and the second side 30 may include the respective handles 16 as well as the respective side shelves 22 or the like extending therefrom. The front side 24 may define an opening 32 within the upstanding side wall 20 that exposes a baking chamber 34. The front side 24 may also include a lower opening 36 therein to facilitate access or viewability to various components below the baking chamber 34.

Further, the front side 24 may also include various knobs, such as a fuel knob 38 and an igniter knob 40. As known to one of ordinary skill in the art, the fuel knob 38 may be coupled to various valves, tubing, and other structural components, such as a heat source 42 or fuel tank configured to facilitate and control heating of the baking chamber 34. For example, the fuel knob 38 may be rotated between an off position and an on position to control release of fuel through a heat element 44 (FIG. 6) and may be turned from the off position to variable open or on positions to regulate the amount of fuel to the heat element 44 therein. Further, the igniter knob 40 may be, for example, depressed to ignite the fuel at the heat element 44 via a typical electrode spark member (not shown) or by employing any other known method.

The main body 12 defined by the upstanding side wall 20 may be partially tubular with a circular or square/rectangular cross-section. In one embodiment, the front side 24 of the upstanding side wall 20 may be substantially flat or planar and each of the first side 28, second side 30, and rear side 26 may be a continuous one-piece member having an arcuate configuration to form a partial cylindrical shape or partial circular cross-sectional shape (see FIG. 7). With this arrangement, the front side 24 of the upstanding side wall 20 can be fastened to the remaining arcuate portion to form the main body 12. It should be noted that such main body 12 may include other shapes and configurations as well, as known to one of ordinary skill in the art. Further, each of the sides may also be separate pieces of material fastened together to form the main body 12.

The main body 12 may also include a bottom side 46 and a top side 48. The bottom side 46 may include various braces or be enclosed (or partially enclosed) with a panel 47 (FIG. 3) and the top side 48 may be enclosed with the main cover 18. The main cover 18 may be sized and configured to fit over the upstanding side wall 20 of the main body 12. Further, the main cover 18 may be completely removable from the main body 12 or may be, for example, hingeably coupled to the upstanding side wall 20. Also, the main cover 18 may partially define the opening 32 that leads to the baking chamber 34. The main cover 18 may also include a thermometer 136 configured to provide a temperature reading for the user to gage a suitable temperature of the baking chamber 34. Typical readings from the thermometer 136, once reaching a preferred temperature within the baking chamber 34, may be about 350 degrees Fahrenheit or more, but such reading may not reflect the actual temperatures within the baking chamber 34 due to convection heat only being directed side-to-side within the baking chamber 34 and recirculated within the baking oven 10, and not out the opening 32. For example, temperatures within the baking chamber 34 may range between 600-700 degrees Fahrenheit and even range between 500 to 1000 degrees Fahrenheit. In this manner, the thermometer 136 may act as a gage for the user to determine a suitable temperature for baking the food product 8.

The bottom side 46 of the main body 12 may include the legs 14, such as four legs or two sets of legs, extending downward from the main body 12. The legs 14 may also include one or more lower shelves 50 or panels coupled to the legs 14 to provide additional support to the legs 14. Such legs 14 may also include casters 52 or wheels coupled to two or four of the legs to further facilitate the portability of the baking oven 10. The various structural components of the baking oven, such as the main body 10, main cover 18, legs 14, side shelves 16, and other structural components may be formed of various metallic materials, such as steel, stainless steel, or any other suitable material with high temperature ratings and be formed from known structural components, such as sheet metal at various gauges/thicknesses or other known metallic structures, such as tubing or the like, and may be formed and manufactured through various known processes in the art, such as casting, welding, rolling, bending, fastening, etc. Further, structural components of the baking oven that are exposed to high temperatures may be formed from suitable materials with high temperature ratings, as known to one of ordinary skill in the art.

With respect to FIG. 2, a partially exploded view of some of the structural components of the baking oven 10 is provided to illustrate in what manner such components are arranged relative to the main body 12. For example, the main body 12 may be sized and configured to support a rotating member 54 and a heat shield 56. The rotating member 54 may support a lower stone 58 and the heat shield 56 may support an upper stone 60. The heat shield 56 and upper stone 60 may support or be covered by a heat cover 62 and the main body 12 may receive or be covered by the main cover 18. The lower stone 58 and the upper stone 60 may each be a typical flat pizza stone sized and configured for baking pizza, or other food products, as known by one of ordinary skill in the art.

Referring now to FIGS. 1, 2, and 6, as previously set forth, the baking chamber 34 is accessible through the opening 32 defined in the front side 24 of the main body 12. The baking chamber 34 may include the rotating member 54, the lower stone 58, the upper stone 60, the heat shield 56, and the heat cover 62. Such baking chamber 34 may be defined or bordered/surrounded by the heat shield 56 and the lower and upper stones 58, 60, the other components employed to enhance the utility or effectiveness of the baking chamber 34, as discussed herein. The baking chamber 34 may be heated with the heat element 44, via the heat source 42, and configured to emanate heat from below the baking chamber 34.

The rotating member 54 may include a flat panel 64 and a shaft 66 made of a metallic material, such as steel or any other suitable material that has a high temperature rating. The shaft 66 extending from an underside surface 68 of the flat panel 64. The flat panel 64 may be substantially planar with a lip 70 extending upward from a topside surface 72 and along a periphery 74 of the flat panel 64. Such topside surface 72 of the flat panel 64 may be configured to support and position the lower stone 58 thereon. The lip 70 of the flat panel 64 may be configured to maintain and engage a periphery of the lower stone 58 so as to substantially prevent the lower stone 58 from moving or sliding from the topside surface 72 of the flat panel 64. Further, the lower stone 58 may be a disc-like shape with a top surface 100 and bottom surface 102 both being planar such that the bottom surface 102 of the lower stone 58, in whole or its substantial entirety, is in direct contact with the topside surface 72 of the flat panel 64. The shaft 66 of the rotating member 54 may extend from the underside surface 68 of the flat panel 64 and may define an axis 76 along a longitudinal length of the shaft 66. The shaft 66 and the flat panel 64 may be configured to rotate, as indicated by arrow 78, within the main body 12 and about the axis 76.

The heat shield 56 may be sized and configured to suspend and hold the upper stone 60 above the lower stone 58 at a height 80. Such height 80 may be about five inches that may range between about four and six inches and also may range between about four and nine inches. The heat shield 56 may be configured to funnel and control convection heat within the baking chamber 34. Further, the heat shield 56 may provide a separation between the baking chamber 34 and the main body 12 to minimize high temperatures to the main body 12, thereby, limiting potential burn risk to users of the baking oven 10.

The heat shield 56 may extend upward and inward from a lower end 82 to an upper end 84, the lower end 82 positioned adjacent or against the upstanding side wall 20 of the main body 12 and the upper end 84 including a ledge 86 to support and hold the upper stone 60. The upper end 84 and ledge 86 of the heat shield 56 may extend to define a shield opening 88 therein such that, upon the upper stone 60 being positioned on the heat shield 56, a bottom surface 90 of the upper stone 60 is substantially exposed in the baking chamber 34. The lower end 82 of the heat shield 56 may extend from at least the first side 28 and the second side 30 of the main body 12. In another embodiment, the heat shield 56 may extend from the first and second sides 28, 30 and the rear side 26 of the main body 12 such that the lower end 82 of the heat shield 56 corresponds with and abuts against the upstanding sidewall 20 of the main body 12. In another embodiment, the heat shield 56 may radially extend upward and inward between the lower end 82 and the upper end 84 in a partial cone configuration, extending upward and inward from the first side 28, second side 30, and the rear side 26 of the main body 12.

Figure 8:
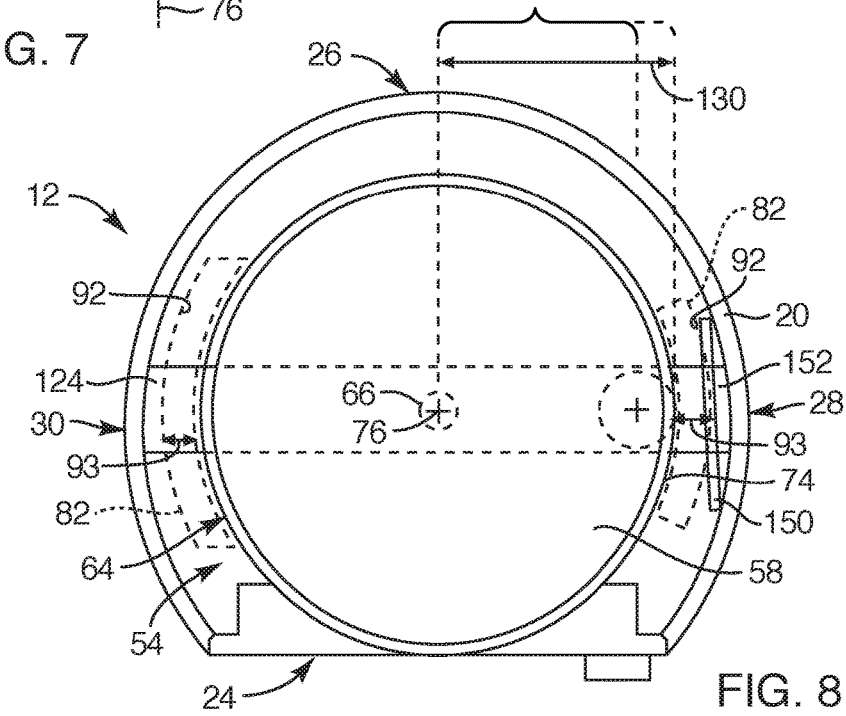
FIG. 8 is a partial top view of the baking oven without the components positioned above a lower stone, depicting a location of a heat element relative to the lower stone of the baking oven, according to another embodiment of the present invention.

Further, the heat shield 56 (or upstanding sidewall 20 of the main body 12) and the periphery 74 of the flat panel 64 may define an air-flow gap 92 therebetween (see also FIG. 8). Such air-flow gap 92 may be configured to flow convection heat therethrough such that the flat panel 64 includes a diameter 94 that is less than a distance 96 between the upstanding wall 20 of the first side 28 and the second side 30 of the main body 12 to provide the air-flow gap 92. Similarly, the diameter 94 of the flat panel 64 may be less than a distance between opposite sides of the lower end 82 of the heat shield 56 extending from the first and second sides 28, 30 of the main body 12.

The heat shield 56 may extend from or be supported by side wall extensions 98 coupled to the upstanding side wall 20. In one embodiment, the side wall extensions 98 may be positioned on the first and second sides 28, 30 of the main body 12 such that the lower end 82 of the heat shield 56 may be positioned about level with a plane of the flat panel 64. In another embodiment, side wall extensions 98a (as shown in outline in FIG. 6) may be positioned on the first and second sides 28, 30 of the main body 12 so that the lower end 82 of the heat shield 56 may be positioned below the plane of the flat panel 64. In another embodiment, side wall extensions 98b (as shown in outline in FIG. 6) may be positioned on the first and second sides 28, 30 of the main body 12 so that the lower end 82 of the heat shield 56 is positioned above the plane of the flat panel 64. Such side wall extensions 98 may also be positioned on the rear side 26 of the main body 12.

Figure 7:
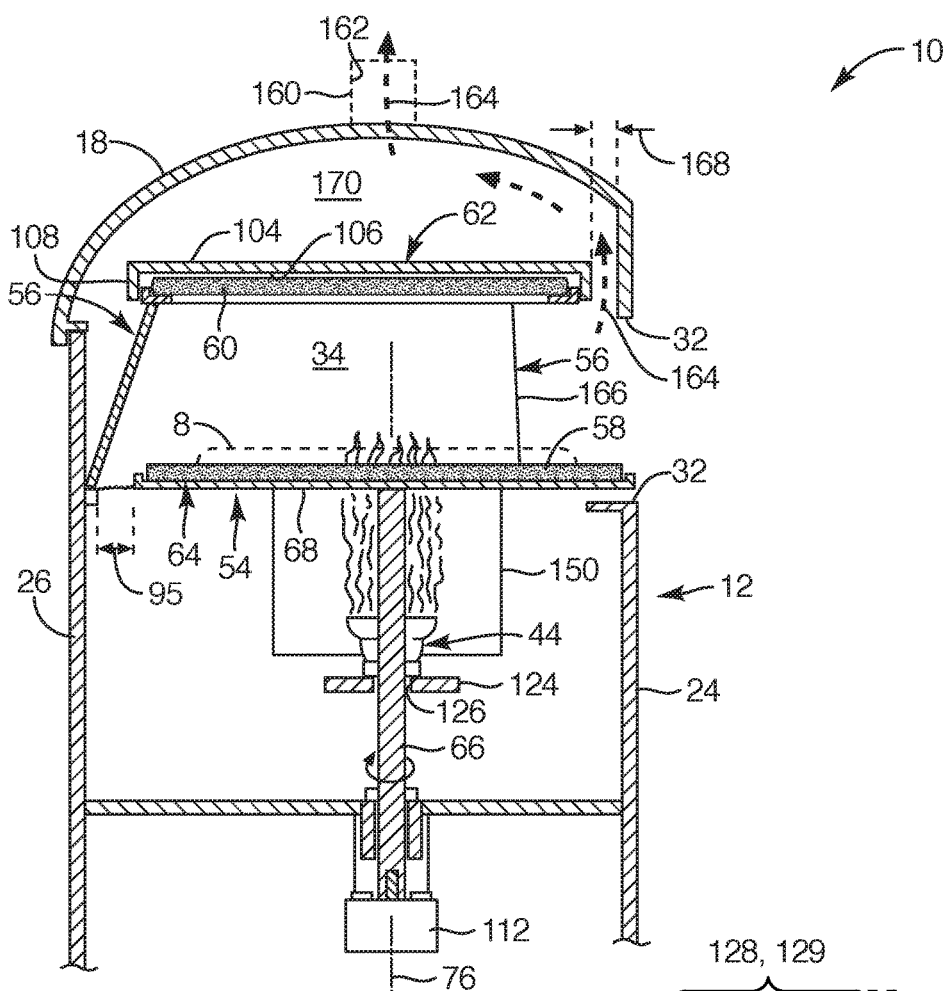
FIG. 7 is a partial cross-sectional side view of the baking oven, taken along section line B of FIG. 1, according to another embodiment of the present invention.

With reference to FIGS. 6-8, in another embodiment, the main body 28 may include a second heat shield 150 sized and configured to shield heat from conducting to the outer portions of the bake oven 10, such as to the handles 16 (FIG. 1). The second heat shield 150 may be secured with brackets or the like to the main body 28 adjacent to the heat element 44 and below heat shield 56 and the lower stone 58. The second heat shield 150 may be positioned to the main body 28 with a gap 152 defined therebetween such that the second heat shield 150 is substantially separated (but for the securing structure for attaching the second heat shield 150) from the main body 28. In this manner, the second heat shield 150 may be positioned adjacent the heat element 44 to minimize heat from conducting to outer surfaces of the bake oven 10, such as to the handles 16 of the bake oven 10.

With continued reference to FIGS. 6-8, the air-flow gap 92 may include a distance 93, measured between the periphery 74 of the flat panel 64 and the lower end 82 of the heat shield 56 on both the first and second sides 28, 30 of the baking oven 10, of about one inch and may range between a half inch and up to about three inches. Although not proportionately shown in the simplified drawings, a gap distance 95 defined between the heat shield 56 and the periphery 74 of the flat panel 64 on the rear side 26 of the main body 12 may be narrower than the air-flow gap 92 with a range between about a quarter inch to a half inch. The gap distance 95 on the rear side 26 is preferably minimized to promote the convection heat to be directed side-to-side through the air-flow gaps 92 within the baking chamber 34 and to be recirculated within the baking chamber 34 to minimize heat loss and maintain high temperatures within the baking oven 10, as set forth herein.

Referring to FIGS. 2, 6, and 7, the heat cover 62 may be sized and configured to be positioned to lay over the upper stone 60 and a portion of the heat shield 56. Further, the heat cover 62 may be configured to contain and channel heat relative to the baking chamber so that the upper stone 60 may primarily radiate heat downward from the exposed bottom surface 90 of the upper stone 60. The heat cover 62 may include an upper surface 104 and lower surface 106 with a downward extending extension 108 along a periphery of the heat cover 62. Such periphery of the heat cover 62 may be slightly larger than a periphery of the upper end 84 of the heat shield 56 so that the heat cover maintains its position over the upper stone 60. The heat cover 62 may be made from a metallic material, such as aluminum or steel, or any other suitable material, sized and configured to facilitate the upper stone 60 to maintain heat therein and radiate heat downward from the exposed bottom surface 90.

Figure 3:
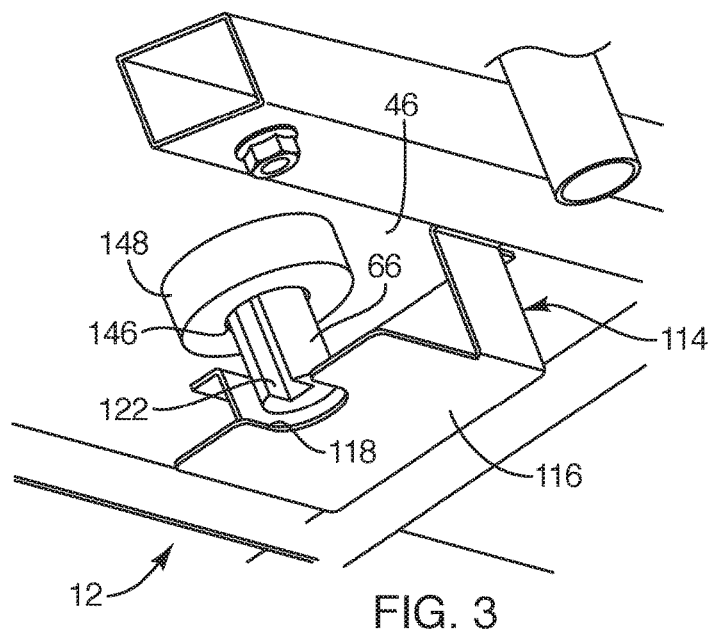
FIG. 3 is a partial bottom perspective view of the baking oven, depicting a shaft extending through an opening of the baking oven, according to one embodiment of the present invention.
Figure 4:
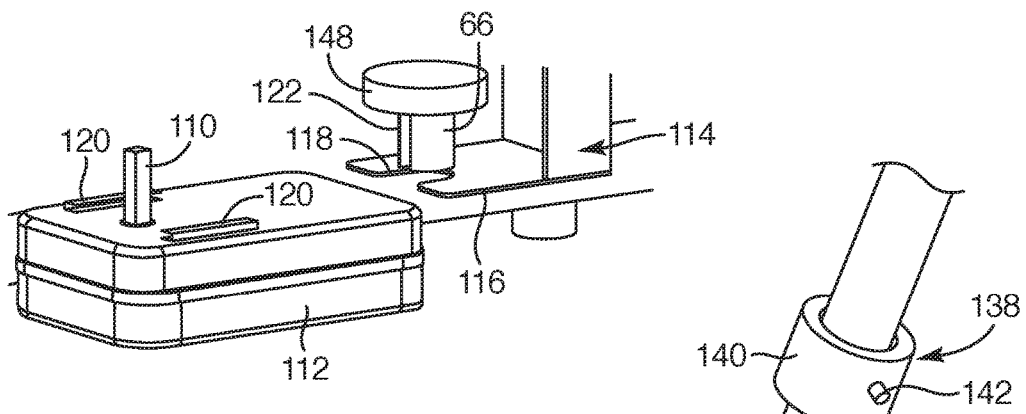
FIG. 4 is a partial perspective view of a motor and a shaft of the baking oven, in a non-coupled position, according to another embodiment of the present invention.

Now with reference to FIGS. 3, 4, and 6, the shaft 66 of the rotating member 54 may be coupled to a drive shaft 110 of a motor 112 such that the axis 76 of the shaft 66 aligns with a drive shaft axis of the drive shaft 110. In one embodiment, the shaft 66 may extend through a hole 146 defined in the bottom side 46 of the main body 12 to a motor bracket 114, the motor bracket 114 being coupled to the main body 12. The bottom side may include a bearing portion 148 including a ball bearing arrangement (not shown) sized and configured to limit friction and facilitate smooth rotation of the rotating member.

The motor bracket 114 may include a tongue 116 defining a tongue opening 118 therein. The tongue opening 118 may be sized and configured to receive the drive shaft 110 and be aligned with the shaft 66. The motor 112 may include two rail brackets 120 sized and configured to couple to the tongue 116 such that outer sides of the tongue 116 slide between the rail brackets 120 to position and couple the motor 112 to the motor bracket 114. Once the motor 112 is positioned and coupled to the motor bracket 114, the drive shaft 110 extends upward through the tongue opening 118 and couples to the shaft 66. In one embodiment, a bottom end of the shaft 66 may include a notch 122 defined therein and sized to receive and correspond with the external surface/structure of the drive shaft 110. For example, the drive shaft 110 may include one or more flat surfaces to correspond with the notch 122 defined in the shaft 66 to enable engagement and facilitate driving rotation of the shaft 66. In one embodiment, the drive shaft 110 may include at least four flat surfaces so as to exhibit a square shape as a cross-section taken along a section line transverse to the drive shaft axis. With this arrangement, the motor 112 can rotate the rotating member 54 about the axis 76 of the shaft 66. The motor may be battery powered or may be connected to a power source, as known in the art.

Figure 5:
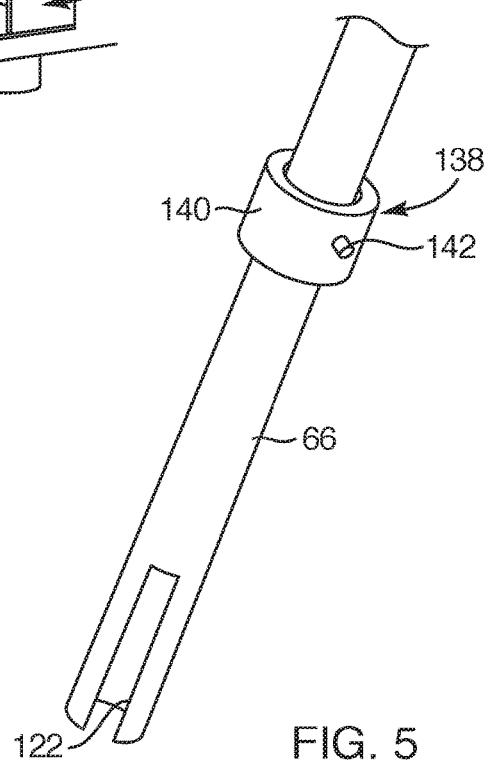
FIG. 5 is a perspective view of an end portion of a rotating member, depicting the shaft of the rotating member including an adjustable member, according to another embodiment of the present invention.

With reference to FIGS. 5 and 6, the shaft 66 of the rotating member 54 may include an adjustable member 138. The adjustable member 138 may be sized and configured to adjust a height of the rotating member 54 or, more specifically, adjust the height 80 between the lower stone 58 and to the upper stone 60. The adjustable member 138 may include a sleeve 140 with a set screw 142 extending therethrough. The set screw 142 may be configured to be loosened to adjust a position of the sleeve 140 on the shaft 66 and then tightened to maintain the position of the sleeve 140 on the shaft 66. The adjustable member 138 may be located on the shaft 66 at a position that facilitates the shaft 66 to mate with the drive shaft 110 of the motor 112. The adjustable member 138 may be located at various positions along the shaft 66 so long as the drive shaft 110 can mate with the shaft 66 of the rotating member 54. For example, the adjustable member 138 may be adjusted to a lower position, than that which is depicted, to raise the rotating member 54 and to effectively adjust the height 80 between the lower stone 58 and the upper stone 60 within the baking chamber 34.

Referring again to FIGS. 6, 7, and 8, the location for emanating heat from the heat element 44 below the baking chamber 34 in the main body 12 of the baking oven 10 is depicted. The baking oven 10 may include a cross-member 124 or seat extending between the first side 28 and the second side 30 of the main body 12 below the flat panel 64 of the rotating member 54 such that the cross-member 124 may be centered under the flat panel 64 so that the shaft 66 extends through a hole 126 defined in the cross-member 124. Further, the cross-member 124 may extend between the first side 28 and second side 30 of the main body 12. In another embodiment, the cross-member may extend substantially parallel with the front side 24 of the main body 12. Such cross-member 124 or seat may include the location for the heat element 44 coupled to the heat source 42 (FIG. 1) for emanating heat therefrom. For example, the heat element 44 may be positioned adjacent the first side 28 (or the second side 30) of the main body 12 directly on the cross-member 124. The position of the heat element 44 along the cross-member 124 may be a distance 128 from the axis 76 of the shaft 66 to a central axis of the heat element 44 that corresponds to about a radial distance 130 or radius of the flat panel 64 such that the heat element 44 is positioned about directly below the periphery 74 of the flat panel 64 adjacent the first side 28 or the second side 30 of the main body 12. In this manner heat may emanate upward from the heat element 44 along the first side 28 (or the second side 30) of the main body 12 and below the flat panel 64 and move upward through the air-flow gap 92.

In another embodiment, the location of the heat element 44 may extend closer to the first side 28 of the main body, as indicated by dotted line 129. In another embodiment, the heat element 44 may include an elongated or oval shape such that the effective distance 128 of the heat element 44 may be located relatively closer to the first side 28 of the main body 18. Importantly, the heat element 44 is positioned adjacent one of the first and second sides 28, 30 of the main body 12 such that the heat element 44 emanates heat upward to a portion of the underside surface 68 of the flat panel 64 and through the air-flow gap 92. In other words, the heat element 44 may be located and positioned solely adjacent to one of the first side 28 and second side 30 of the main body 12 (specifically excluding being adjacent the rear side 26 and the front side 24 of the main body 12). The heat element 44 may be a burner made from cast iron and may include various configurations, such as circular, oval, u-shaped, or any other suitable configuration to facilitate emanating heat to the flat panel 64 and through the air-flow gap 92 of one of the first and second sides 28, 30 of the main body 12.

As previously set forth, the flat panel 64 includes the lower stone 58 positioned thereon, the lower stone 58 rotating with the flat panel 64 via the motor 112 coupled to the shaft 66. As such, heat emanating from the heat element 44 provides heat directly to the underside surface 68 of the flat panel 64 before moving upward through the air-flow gap 92. As the flat panel 64 is heated by the heat element 44, conduction heat moves directly from the flat panel 64 to the lower stone 58 since surfaces of the flat panel and lower stone substantially correspond with each other, e.g., planar surfaces. Due to rotation of the flat panel 64 and lower stone 58 and the heat emanating only at one side of the underside surface 68 of the flat panel 64, the heating of the lower stone 58 is controlled and minimized to substantially prevent "hot spots" so that the food product 8 does not burn on the lower stone 58.

The upper stone 60 may be primarily heated by convection heat, as depicted by arrow 132, moving upward from the air-flow gap 92 and along the heat shield 56 and then across a length of the upper stone 60, the length being similar to the diameter 94 of the lower stone 58. Further, as depicted by arrow 132, the convection heat moves downward along the heat shield 56 and through the air flow gap 92 on an opposite side, adjacent the second side 30, from where the convection heat entered the baking chamber 34. The convection heat may continue under the flat panel 64 and be drawn toward the heating element 44 and move upward again with the convection heat emanating upward through the original air-flow gap 92. With this arrangement, the convection heat may move through the baking chamber 34 in a side-to-side manner and continue to move under the flat panel 64 such that the convection heat recirculates through the system (essentially moving around the flat panel) in a rotational manner, thereby, minimizing heat loss. In addition, upon the upper stone 60 being heated by the convection heat, the upper stone 60 provides radiation heat directed downward to the food product 8 positioned on the lower stone 58. Further, this arrangement minimizes the loss of convection heat through the opening 32 of the baking chamber 34 by re-circulating or rotating through the baking oven 10 in the side-to-side manner (first side 28 to second side 30, not rear side 26 to front side 24) or rotational manner, as indicated by arrows 132.

With reference to FIGS. 6 and 7, in another embodiment, the main cover 18 may include a flue or duct structure 160 formed therein to define a top opening 162 to facilitate drawing convection heat through the main cover 18. The flue or duct structure 160 may be tubular or the like. In one embodiment, the duct structure 160 may include a swingable flap that may readily be moved between closed, open, and partially open positions. In another embodiment, the duct structure 160 may be a simple opening or vents at the top of the main cover 18. With this duct structure 160, the convection heat may flow from the heat element 44 into the baking chamber 34 and flow from, for example, one side to the other side (not rear to front) of the baking chamber 34 in a side-to-side manner, similar to that previously set forth. The convection heat, as shown with dotted arrow 164, may then flow around a front periphery 166 of the heat shield 56 and upward through a lateral cover gap 168 defined between the heat cover 62 and the main cover 18. Such lateral cover gap 168 may be defined around the entire extent of the heat cover 62 and the main cover 18. Further, a front lip of the main cover that defines the opening 32 of the baking chamber 34 may extend downward below an elevation of the upper stone 60. Such front lip may further assist in drawing any convection heat to flow around the front periphery 166 of the heat shield 56 and upward through the lateral cover gap 168. The convection heat may then flow into a cover space 170 between an upper surface 104 of the heat cover 62 and the main cover 18 and then through the duct structure 160 and out the top opening 162 of the baking oven 10. With this arrangement, the convection heat may be channeled to provide maximum heating within the baking chamber 34 by flowing side-to-side therein (similar to the previous embodiment), and then channeled through the upper regions of the baking oven 10 and out the duct structure 160.

Referring to FIGS. 1 and 6, description of cooking a food product 8 in the baking oven 10 of the present invention will now be provided. Initially, the motor 112 should be switched on so that the drive shaft 66 can rotate the rotating member 54, as indicated by rotational arrow 78. Also, the appropriate valve of the fuel source 42 should be moved to an open position, after which, the fuel knob 38 may be rotated to an open position. The fuel element 44 may then be ignited by simply depressing the igniter knob 40 or, otherwise, employing a match or the like adjacent the fuel element 44. Once the fuel element 44 has ignited, flames or emanating heat from the fuel element 44 extend upward therefrom and may directly contact the underside surface 68 of the flat panel 64, as the flat panel 64 rotates, and may also extend upward through the air flow gap 92 adjacent, for example, the first side 28 of the main body 12. The air within the baking chamber will become heated and, due to the unique arrangement and sizing of the elements within the baking chamber 34, the convection heat will move within the baking chamber in a side-to-side manner or rotational manner, as indicted by arrows 132, initially moving upward from the air-flow gap 92 adjacent the first side 28 of the baking chamber 34 and along the heat shield 56, across a length of the upper stone 60 to an opposite side of the baking chamber 34, and then downward along the heat shield 56 and through the opposite side of the air-flow gap 92 adjacent the second side 30 of the main body 12. The convection heat may re-circulate as the convection heat is drawn across the main body 12 under the flat panel 64 toward the upward extending emanating heat from the heating element 44. Alternatively, as previously set forth, the convection heat may heat the baking chamber 34 by flowing side-to-side therein (as shown by arrow 132 within the baking chamber 34) and then the convection heat may be channeled toward the upper regions of the baking oven 10 and out the duct structure 160, as shown by dotted arrow 164. In a relatively short period of time, e.g., as quick as ten minutes, the baking oven will be sufficiently heated for baking a food product 8, such as pizza or the like. The user can view the thermometer to gage a suitable temperature.

The food product 8 may then be placed and positioned directly onto the top surface 100 of the lower stone 58. With this arrangement, the emanating heat from the heat element 44 heats the underside surface 68 of the flat panel 64, moving conduction heat directly from the flat panel 64 to the lower stone 58 for heating and baking the food product 8 on the lower stone 58. Further, the emanating heat from the heat element 44 flows through the air-flow gap 92 on, for example, the first side 28 to provide convection heat, as indicated by arrow 132, directly to the upper stone 60, the convection heat moving through the baking chamber 34 in the side-to-side manner or through the main body 12 in a re-circulating rotational manner, as previously set forth. The heated upper stone 60, suspended above the food product 8, provides radiation heat downward from the upper stone 60 to heat and bake the food product 8. In this manner, the radiation heat from the upper stone 60 and the convection heat moving through the baking chamber 34 may cook an upper side of the food product 8. The cook or user may visually determine when the food product is cooked to his or her liking, typically taking about two to four minutes, dependent upon the level of heat the user may employ on the baking chamber.

Although the disclosure herein has been directed to cooking a food product, such as pizza or the like, other food products may readily be employed in the baking oven of the present invention. For example, it is also contemplated that the lower stone may receive a grill like member (not shown) to cook other types of food products, such as steaks or the like. As set forth herein, the unique structural arrangement of the baking oven readily facilitates obtaining and maintaining high temperatures within the baking oven. As such, cooking other types of food products within the baking oven may readily be employed.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A baking oven for baking a food product, comprising:
   a main body including one or more walls to define a front side, a rear side, a first side, a second side, and an upper side of the main body, the front side defining a front access opening to a baking chamber within the main body;
   a heat shield including an upper portion and a lower portion, the upper portion extending to define a ledge, the lower portion having a side wall extending between an upper end and a lower end, the upper end extending from the ledge and the lower end positionable to extend along the first side, the rear side and the second side of the main body such that the side wall extends continuously therealong so as to act as a barrier between the baking chamber and the main body;
   a first stone and a second stone defining a bottom surface and an upper surface of the baking chamber, respectively, the first stone configured to receive the food product thereon and the second stone configured to be positioned over the ledge of the heat shield to be suspended above the first stone; and
   a heat element coupled to the main body, the heat element configured to be positioned to emanate heat from below the first stone such that heat moves upward from the heat element to heat the first stone, and moves upward along an inner surface of the side wall of the heat shield toward the second stone to heat the second stone.

2. The baking oven of claim 1, further comprising a rotating member and a motor, the rotating member including a flat panel and a shaft, the flat panel configured to support the first stone thereon, the shaft extending from an underside surface of the flat panel and defining an axis along a longitudinal length thereof, the motor coupled to the main body and the shaft of the rotating member such that the motor is configured to rotate the rotating member about the axis of the shaft.

3. The baking oven of claim 2, wherein the heat element emanates heat directly to the underside surface of the flat panel to conduct heat directly from the flat panel to the first stone as the flat panel rotates.

4. The baking oven of claim 1, wherein the ledge of the heat shield extends to define a shield opening such that the shield opening is sized to directly expose the second stone to heat the second stone in the baking chamber.

5. The baking oven of claim 1, wherein the ledge extends to define an inner periphery of the upper portion of the heat shield such that the inner periphery is sized to directly expose the second stone to heat the second stone in the baking chamber.

6. The baking oven of claim 1, wherein the heat element is coupled to a heat source, the heat source including at least one of propane gas and natural gas.

7. The baking oven of claim 1, wherein the second stone is configured to radiate heat downward toward the first stone upon convection heat heating the second stone.

8. The baking oven of claim 1, further comprising a heat cover sized and configured to be positioned over an upper side surface of the second stone.

9. The baking oven of claim 1, wherein the upper side of the main body comprises a main cover sized and configured to be positioned over the one or more walls of the first side, the second side, and the rear side of the main body.

10. A baking oven for baking a food product, comprising:
    a main body including one or more walls to define a front side, a rear side, a first side, a second side, and an upper side of the main body, the front side defining a front access opening to a baking chamber within the main body, the baking chamber including:
       a lower stone operatively supported by the main body and configured to receive the food product thereon;
       an upper stone suspended above the lower stone; and
       a heat shield including an upper portion and a lower portion, the upper portion extending to define a ledge sized and configured to support the upper stone, the lower portion having a side wall extending between an upper end and a lower end, the upper end extending from the ledge and the lower end positionable to extend along the first side, the rear side and the second side of the main body such that the side wall extends continuously to act as a barrier between the baking chamber and the main body; and
    a heat element coupled to the main body, the heat element configured to be positioned to emanate heat from below the lower stone such that heat moves upward from the heat element to heat the lower stone, and moves upward along an inner surface of the side wall of the heat shield toward the upper stone to heat the upper stone.

11. The baking oven of claim 10, further comprising a flat panel configured to rotate, the flat panel operatively coupled to the main body and configured to support the lower stone thereon.

12. The baking oven of claim 11, wherein the heat element emanates heat directly to an underside surface of the flat panel to conduct heat directly from the flat panel to the lower stone as the flat panel rotates.

13. The baking oven of claim 10, wherein the ledge of the heat shield extends to define an inner periphery of the upper portion of the heat shield such that the inner periphery is sized to directly expose the upper stone to heat the upper stone in the baking chamber.

14. The baking oven of claim 10, further comprising a heat cover sized and configured to be positioned over an upper side surface of the upper stone.

15. The baking oven of claim 10, wherein the upper side of the main body comprises a main cover sized and configured to be positioned over the one or more walls of the first side, the second side, and the rear side of the main body.

16. A baking oven for baking a food product, comprising:
 a main body including one or more walls to define a front side, a rear side, a first side, a second side, and an upper side of the main body, the front side defining a front access opening to a baking chamber within the main body, the baking chamber including:
  a lower stone positioned on a support structure operatively coupled to the main body, the support structure having a periphery extending to define a gap between the periphery and the one or more walls of the main body, the lower stone configured to receive the food product thereon;
  an upper stone suspended above the lower stone; and
  a heat shield including an upper portion and a lower portion, the upper portion extending to define a ledge sized and configured to support the upper stone, the lower portion having a side wall extending from the ledge to a lower end, the lower end of the heat shield positioned adjacent the gap so as to extend along the first side, the rear side and the second side of the main body such that the side wall extends continuously to act as a barrier between the baking chamber and the main body; and
 a heat element coupled to the main body, the heat element configured to be positioned to emanate heat below the support structure so that heat moves through the gap and into the baking chamber.

17. The baking oven of claim 16, wherein the support structure comprises a flat panel, the flat panel coupled to a shaft so that the shaft extends from an underside surface of the flat panel and defines an axis along a longitudinal length of the shaft, the shaft coupled to a motor such that the motor is configured to rotate the shaft and the flat panel about the axis of the shaft.

18. The baking oven of claim 16, wherein the ledge of the heat shield extends to define an inner periphery of the upper portion of the heat shield such that the inner periphery is sized to directly expose the upper stone to heat the upper stone in the baking chamber.

19. The baking oven of claim 16, further comprising a heat cover sized and configured to be positioned over an upper side surface of the upper stone.

20. The baking oven of claim 16, wherein the upper side of the main body comprises a main cover sized and configured to be positioned over the one or more walls of the first side, the second side, and the rear side of the main body.

* * * * *